(12) United States Patent
Kang et al.

(10) Patent No.: US 12,052,282 B2
(45) Date of Patent: Jul. 30, 2024

(54) AUTOMATIC DETECTION OF PROXY-BASED PHISHING SITES

(71) Applicant: PayPal, Inc., San Jose, CA (US)

(72) Inventors: Abraham Joseph Kang, Los Gatos, CA (US); Bharat Chandra Penta, Bayonne, NJ (US); Antonio Montanez, Jr., West Covina, CA (US); Faisal M Khan, Berkeley, CA (US); Vinh Nguyen, Mesa, AZ (US); Casey Ian Abernathy, Richmond, CA (US); Ilya Volodin, Weston, CA (US)

(73) Assignee: PayPal, Inc., San Jose, CA (US)

( * ) Notice: Subject to any disclaimer, the term of this patent is extended or adjusted under 35 U.S.C. 154(b) by 276 days.

(21) Appl. No.: 17/411,873

(22) Filed: Aug. 25, 2021

(65) Prior Publication Data
US 2023/0067897 A1    Mar. 2, 2023

(51) Int. Cl.
*H04L 9/40*         (2022.01)
(52) U.S. Cl.
CPC ................ *H04L 63/1483* (2013.01)
(58) Field of Classification Search
CPC .................................................. H04L 63/1483
See application file for complete search history.

(56) References Cited

U.S. PATENT DOCUMENTS

| | | | |
|---|---|---|---|
| 8,528,094 B1 * | 9/2013 | La Grenade | G06F 21/564 726/25 |
| 9,473,516 B1 * | 10/2016 | Jezorek | H04L 67/01 |
| 10,440,042 B1 * | 10/2019 | Stein | G06N 20/00 |
| 10,453,017 B1 * | 10/2019 | Richards | H04L 61/4511 |
| 10,671,726 B1 * | 6/2020 | Paithane | H04L 63/1416 |
| 10,855,722 B1 * | 12/2020 | Vadlamani | H04L 63/1408 |
| 10,931,691 B1 * | 2/2021 | Kapelevich | H04L 63/1441 |
| 11,457,022 B1 * | 9/2022 | Neel | H04L 63/1416 |
| 11,496,511 B1 * | 11/2022 | Guo | H04L 63/1483 |
| 2006/0010430 A1 * | 1/2006 | Cousot | G06F 21/16 717/127 |
| 2006/0015722 A1 * | 1/2006 | Rowan | H04L 63/0823 713/166 |

(Continued)

OTHER PUBLICATIONS

VENMO website, https://venmo.com/, last accessed on Aug. 5, 2021.

*Primary Examiner* — Khang Do
(74) *Attorney, Agent, or Firm* — Greenberg Traurig, LLP

(57) ABSTRACT

Systems and/or techniques for facilitating automatic detection of proxy-based phishing sites are provided. In various embodiments, a system can access a computer-executable web resource and can embed an authorization verification logic within the computer-executable web resource. In various aspects, upon execution of the computer-executable web resource, the authorization verification logic can be configured to: identify a computing domain via which the computer-executable web resource is being executed; compare the identified computing domain with one or more authorized computing domains; determine that the identified computing domain is an unauthorized proxy site if the identified computing domain does not match at least one of the one or more authorized computing domains; and initiate a remedial action based on determining that the identified computing domain is an unauthorized proxy site.

17 Claims, 10 Drawing Sheets

(56) References Cited

U.S. PATENT DOCUMENTS

| | | | |
|---|---|---|---|
| 2006/0200855 A1* | 9/2006 | Willis | H04L 9/3213 726/2 |
| 2007/0033639 A1* | 2/2007 | Goodman | H04L 63/1416 726/2 |
| 2010/0186088 A1* | 7/2010 | Banerjee | H04L 63/1433 709/224 |
| 2010/0269175 A1* | 10/2010 | Stolfo | H04L 63/1491 726/22 |
| 2011/0055922 A1* | 3/2011 | Cohen | H04L 63/1475 726/22 |
| 2013/0263226 A1* | 10/2013 | Sudia | H04L 63/08 726/4 |
| 2015/0172253 A1* | 6/2015 | Wilf | H04L 67/01 709/224 |
| 2016/0057167 A1* | 2/2016 | Bach | H04L 63/101 726/23 |
| 2016/0094555 A1* | 3/2016 | Kiperberg | H04L 63/0435 713/190 |
| 2017/0063923 A1* | 3/2017 | Yang | G06F 21/54 |
| 2018/0007090 A1* | 1/2018 | Cao | H04L 63/101 |
| 2018/0063190 A1* | 3/2018 | Wright | H04L 63/1425 |
| 2018/0191777 A1* | 7/2018 | Volkov | H04L 63/1483 |
| 2019/0014133 A1* | 1/2019 | David | H04L 67/02 |
| 2019/0044964 A1* | 2/2019 | Chari | G06F 18/23 |
| 2019/0068723 A1* | 2/2019 | Drasin | H04L 67/02 |
| 2019/0132356 A1* | 5/2019 | Vargas Gonzalez | H04L 63/1425 |
| 2019/0356684 A1* | 11/2019 | Sinha | H04L 63/1458 |
| 2019/0394235 A1* | 12/2019 | Pryce | H04L 63/1416 |
| 2020/0007576 A1* | 1/2020 | Buhacoff | H04L 9/3247 |
| 2020/0021609 A1* | 1/2020 | Kuppanna | H04L 63/20 |
| 2020/0028876 A1* | 1/2020 | Cohen | H04L 63/1425 |
| 2020/0084225 A1* | 3/2020 | McKendall | G06F 21/54 |
| 2020/0092326 A1* | 3/2020 | Prakash | G06F 16/955 |
| 2020/0186563 A1* | 6/2020 | Convertino | G06N 20/00 |
| 2020/0278862 A1* | 9/2020 | Webb | G06F 16/24566 |
| 2020/0382311 A1* | 12/2020 | Bueno | H04L 63/123 |
| 2020/0410494 A1* | 12/2020 | Ali | G06F 16/955 |
| 2021/0006591 A1* | 1/2021 | Akuka | H04L 63/1416 |
| 2021/0021637 A1* | 1/2021 | Srivastava | H04L 63/0876 |
| 2021/0056201 A1* | 2/2021 | Eftekhari Roozbehani | G06F 21/564 |
| 2021/0160281 A1* | 5/2021 | Hallaji | H04L 63/083 |
| 2021/0218759 A1* | 7/2021 | Ahmed | G06F 11/0793 |
| 2021/0234837 A1* | 7/2021 | Dahan | H04L 63/104 |
| 2021/0314353 A1* | 10/2021 | Melson | H04L 67/02 |
| 2021/0350064 A1* | 11/2021 | Freundlich | G06F 21/602 |
| 2021/0352096 A1* | 11/2021 | Yadav | H04L 63/1433 |
| 2021/0400040 A1* | 12/2021 | Shiga | H04L 9/3263 |
| 2022/0004367 A1* | 1/2022 | Webb | G06F 8/34 |
| 2022/0078205 A1* | 3/2022 | Bjarnason | H04L 63/1425 |
| 2022/0374592 A1* | 11/2022 | Glase | G06F 16/955 |

* cited by examiner ns to an authorized 15
AUTOMATIC DETECTION OF PROXY-BASED PHISHING SITES

TECHNICAL FIELD

The subject disclosure relates generally to proxy-based phishing sites, and more specifically to automatic detection of proxy-based phishing sites, according to various embodiments.

BACKGROUND

A proxy-based phishing site is an unauthorized website that is established by a malicious actor (e.g. "scammer") and that proxies requests from a client device to an authorized website. By proxying requests from the client device to the authorized website, the proxy-based phishing site appears to look and function exactly like the authorized website, while maliciously capturing private information provided by the client device. Accordingly, an operator of the client device may not be aware of the proxy-based phishing site and is likewise not aware that such private information is vulnerable to the proxy-based phishing site. Existing techniques for dealing with proxy-based phishing sites include manual detection and manual elimination. Unfortunately, proxy-based phishing sites are easy to establish. Thus, when one proxy-based phishing site is shut down, the scammer that created it can often create, with very little effort, another proxy-based phishing site to replace it. Thus, proxy-based phishing sites pose an online computer security threat.

Accordingly, systems and/or techniques that can address one or more of these technical problems can be desirable.

DETAILED DESCRIPTION

Figure 1:
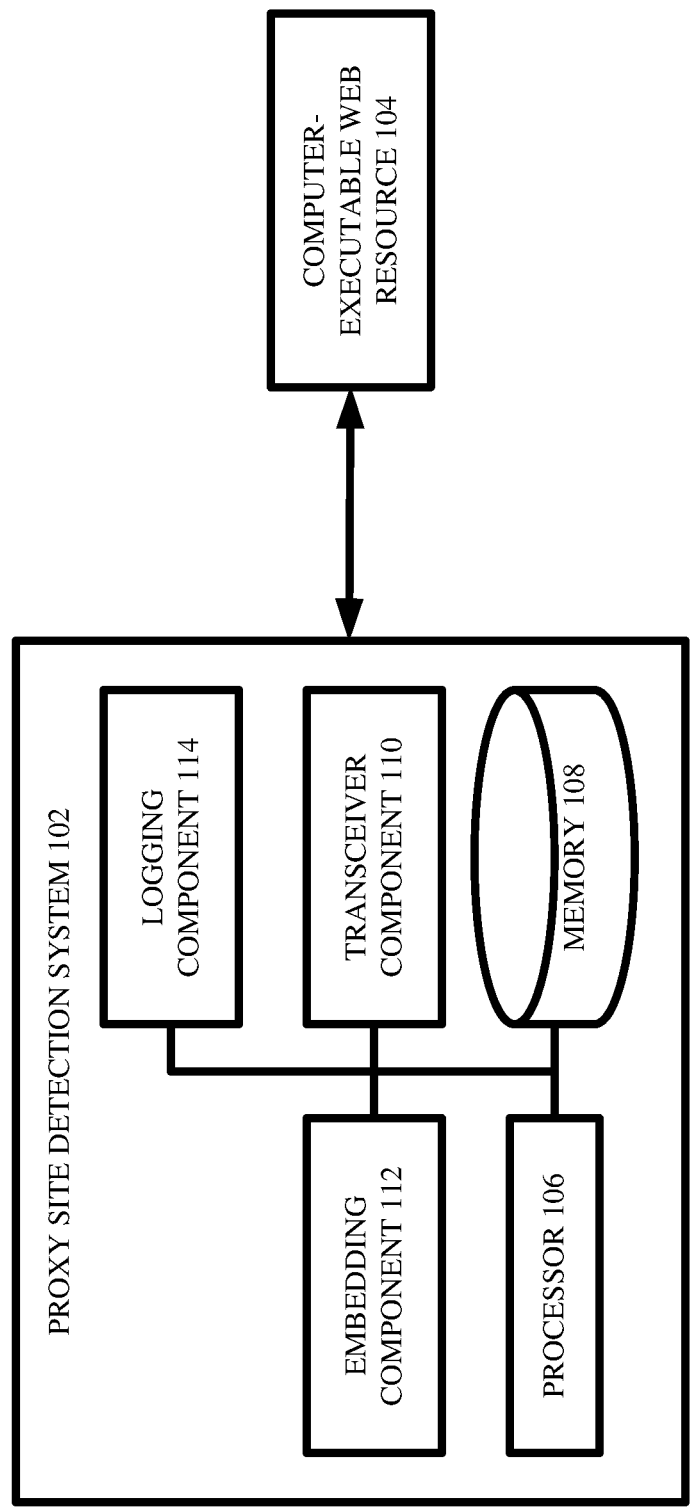
FIG. 1 illustrates a high-level block diagram of an example, non-limiting system that facilitates automatic detection of proxy-based phishing sites in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A proxy-based phishing site can be an unauthorized website that is established by a malicious actor and that proxies requests from a client device (e.g., a laptop computer, a desktop computer, a smart phone) to an authorized website. More specifically, a user of the client device can desire to obtain a particular web resource (e.g., a particular webpage) from the authorized website. When the user has not been phished by the scammer, the following can occur. The user can cause the client device (e.g., a browser of the client device) to electronically transmit to the authorized website a uniform resource locator (URL) that requests the particular web resource. Because the client device is electronically communicating with the authorized website, the URL can specify an authorized computing domain (e.g., an authorized domain name) that corresponds to the authorized website. Accordingly, the authorized website can electronically return to the client device a hypertext markup language (HTML) document that provides the particular web resource.

On the other hand, when the user has been phished by the scammer, proxying of requests can occur as follows. The user can cause the client device to electronically transmit to the proxy-based phishing site a URL that requests the particular web resource. However, because the client device is electronically communicating with the proxy-based phishing site rather than with the authorized website, the URL can specify an unauthorized computing domain (e.g., an unauthorized domain name) that corresponds to the proxy-based phishing site. After receiving the URL, the proxy-based phishing site can rewrite the URL, such that the rewritten URL recites the authorized computing domain instead of the unauthorized computing domain, and the proxy-based phishing site can electronically transmit the rewritten URL to the authorized website. In other words, the proxy-based phishing site can itself request the particular web resource from the authorized website. Accordingly, the authorized website can electronically return to the proxy-based phishing site an HTML document that provides the particular web resource. Since the HTML document can recite the authorized computing domain, the proxy-based phishing site can rewrite the HTML document, such that the rewritten HTML document recites the unauthorized computing domain instead of the authorized computing domain. Accordingly, the proxy-based phishing site can electronically return the rewritten HTML document to the client device.

By proxying requests from the client device to the authorized website in this way, the proxy-based phishing site can act as an intermediary between the client device and the authorized website, meaning that the proxy-based phishing site can maliciously capture and/or record private information (e.g., passwords, social security numbers, answers to security questions, account balances) that is relayed from the client device to the authorized website and/or vice versa. Thus, the proxy-based phishing site can pose a serious security threat to the client device and/or to the authorized website. Moreover, by proxying requests from the client device to the authorized website in this way, the proxy-based phishing site can appear to look and/or function exactly like the authorized website, meaning that the user of the client device can be unaware of the proxy-based phishing site and can mistakenly believe that the client device is electronically communicating directly with the authorized website. In other words, the user of the client device can be completely unaware of the serious security threat that is posed by the proxy-based phishing site.

Existing techniques for dealing with proxy-based phishing sites include manual detection and manual elimination by Internet authorities. Unfortunately, proxy-based phishing sites are easy and quick to establish. Indeed, once one or more scripts for proxying an authorized website are coded, such one or more scripts can easily be reimplemented in any computing domain (e.g., can be reimplemented using any domain name). The only coding change that would have to be made to the one or more scripts in order to facilitate such reimplementation would be simply to change the domain name with which the one or more scripts overwrite and/or rewrite the authorized computing domain of the authorized website. Thus, when one proxy-based phishing site is shut down, the scammer that created it can often create, with very little effort, another proxy-based phishing site to replace it. For at least these reasons, proxy-based phishing sites can be considered as a serious security problem.

Accordingly, systems and/or techniques that can address one or more of these technical problems can be desirable.

Various embodiments described herein can address one or more of these technical problems. One or more embodiments described herein include systems, computer-implemented methods, apparatus, and/or computer program products that can facilitate automatic detection of proxy-based phishing sites. More specifically, various embodiments described herein can facilitate automatic detection of a proxy-based phishing site via an authorization verification logic that is hidden within a web resource. In various aspects, when the web resource is executed, the authorization verification logic that is hidden within the web resource can determine whether the web resource is being executed in and/or by an authorized computing domain (e.g., in and/or by an authorized domain name). If not, the authorization verification logic can conclude that the web resource is being executed in and/or by a proxy-based phishing site, and the authorization verification logic can accordingly initiate one or more remedial actions.

Various embodiments described herein can include a computerized tool (e.g., any suitable combination of computer-executable hardware and/or computer-executable software) that can electronically facilitate automatic detection of proxy-based phishing sites via hidden authorization verification logics. In various cases, the computerized tool described herein can comprise a transceiver component, an embedding component, and/or a logging component.

In various embodiments, there can be a computer-executable web resource. In various aspects, the computer-executable web resource can be any suitable executable digital file, executable digital document, executable digital script, and/or executable digital object. For example, in some cases, the computer-executable web resource can be a webpage and/or an HTML document that defines a webpage. In various instances, the computer-executable web resource can be stored in, maintained by, and/or otherwise controlled by an authorized website. In various aspects, it can be desired to detect when an unauthorized website (e.g., a proxy-based phishing site) is impermissibly executing the computer-executable web resource. As explained herein, the computerized tool can help to facilitate such detection.

In various embodiments, the transceiver component of the computerized tool can electronically receive and/or can otherwise electronically access the computer-executable web resource. In various cases, the transceiver component can electronically retrieve the computer-executable web resource (e.g., can electronically retrieve one or more coding scripts that define the computer-executable web resource) from the authorized website. In various other cases, the transceiver component can electronically retrieve the computer-executable web resource from any suitable database (e.g., graph database, relational database, hybrid database) that is electronically accessible to the transceiver component, whether the database is centralized and/or decentralized, and/or whether the database is remote from and/or local to the transceiver component. In still other cases, the transceiver component can electronically retrieve the computer-executable web resource from any suitable computing device. In any case, the transceiver component can electronically access the computer-executable web resource, such that other components of the computerized tool can electronically interact with (e.g., read, write, edit) the computer-executable web resource.

In various embodiments, the embedding component of the computerized tool can electronically embed an authorization verification logic within the computer-executable web resource. More specifically, the embedding component can electronically insert into the computer-executable web resource (e.g., into the one or more coding scripts that define the computer-executable web resource) the authorization verification logic, where the authorization verification logic can be one or more lines of code that facilitate automatic detection of proxy-based phishing sites, as described below. In various instances, the embedding component can embed and/or insert the authorization verification logic into the computer-executable web resource, such that the authorization verification logic is obfuscated and/or otherwise hidden within the computer-executable web resource. In various cases, the embedding component can implement any suitable coding obfuscation technique to accomplish this. For example, in some cases, the embedding component can physically minimize the font of the authorization verification logic, such that the authorization verification logic is not easily visible and/or noticeable in the computer-executable web resource. As another example, the embedding component can write the authorization verification logic in deceptive syntax (e.g., standard coding commands can be replaced with randomly-named and/or unusually-named coding commands, character-strings can be replaced with numbers, numbers can be replaced with character-strings). As yet another example, the embedding component can apply any suitable cryptographic technique (e.g., white box cryptography) to the authorization verification logic. In any case, the embedding component can electronically embed and/or insert the authorization verification logic into the computer-executable web resource, such that the authorization verification logic is obfuscated, hidden, and/or otherwise not easily noticeable in the computer-executable web resource.

In various instances, the authorization verification logic can be configured to identify, upon execution of the computer-executable web resource, a computing domain (e.g., a domain name) in which, from which, by which, and/or via which the computer-executable web resource is being executed. The authorization verification logic can accomplish this in any suitable fashion. For example, the authorization verification logic can identify the computing domain by identifying the location of a browser that is currently executing the computer-executable web resource. As another example, the authorization verification logic can identify the computing domain by examining a security sockets layer (SSL) context and/or a transport layer security (TLS) context that is currently being used to facilitate the execution of the computer-executable web resource. As still another example, the authorization verification logic can identify the computing domain by examining which domains are specified by the computer-executable web resource itself. In any case, the authorization verification logic can determine what computing domain is currently executing and/or otherwise currently hosting the computer-executable web resource.

In various cases, the authorization verification logic can be configured to compare the identified computing domain to an authorized computing domain that is associated with the authorized website. If the authorization verification logic determines that the identified computing domain matches and/or is otherwise consistent with the authorized computing domain, the authorization verification logic can conclude that the computer-executable web resource is currently being executed and/or hosted by the authorized website. On the other hand, if the authorization verification logic determines that the identified computing domain does not match and/or is not consistent with the authorized computing domain, the authorization verification logic can conclude that the computer-executable web resource is currently being executed and/or hosted by some website other than the authorized website (e.g., is currently being executed and/or hosted by an unauthorized website). In such case, the authorization verification logic can infer and/or assume that the computer-executable web resource is currently being executed and/or hosted by a proxy-based phishing site.

In various aspects, if the authorization verification logic concludes that the computer-executable web resource is currently being executed and/or hosted by the authorized website, the authorization verification logic can be configured to permit the computer-executable web resource to function normally. In contrast, if the authorization verification logic concludes that the computer-executable web resource is currently being executed and/or hosted by a proxy-based phishing site, the authorization verification logic can be configured to initiate one or more remedial actions. In some cases, the one or more remedial actions can include electronically notifying and/or alerting the authorized website (and/or any other entity) of the proxy-based phishing site. In other cases, the one or more remedial actions can include electronically ceasing, ending, impeding, and/or otherwise preventing the execution of the computer-executable web resource by the proxy-based phishing site. In yet other cases, the one or more remedial actions can include causing the computer-executable web resource to execute in safe mode. In still other cases, the one or more remedial actions can include electronically inputting random and/or incorrect information into one or more input fields that are generated by the computer-executable web resource. In various aspects, the one or more remedial actions can include any other suitable actions as desired.

In various aspects, once the embedding component inserts and/or obfuscates the authorization verification logic within the computer-executable web resource, the transceiver component can electronically transmit the computer-executable web resource back to the authorized website (and/or back to the other computing device and/or database from which the transceiver component obtained the computer-executable web resource). Accordingly, the authorized website can provide the computer-executable web resource to computing clients upon request, and the authorization verification logic can automatically determine whether any of such computing clients are proxy-based phishing sites.

In various embodiments, the logging component of the computerized tool can electronically store and/or otherwise maintain a centralized event log. In various aspects, when a scammer creates a proxy-based phishing site, the scammer often quickly and repeatedly tests the proxy-based phishing site themself before actively attempting to phish real-world clients. In some cases, it can be desirable to prevent the authorization verification logic from initiating the one or more remedial actions until after such self-testing by the scammer is complete (e.g., so as to lull the scammer into a false sense of security). In various instances, the centralized event log can be utilized to accomplish this.

In various aspects, the centralized event log can be any suitable data structure in which results produced by the authorization verification logic can be electronically logged, recorded, documented, and/or otherwise flagged. In various instances, when the authorization verification logic concludes that the computer-executable web resource is currently being executed and/or hosted by a proxy-based phishing site, the authorization verification logic can electronically create a record in the centralized event log, which record indicates the identified computing domain of the proxy-based phishing site and/or the time/date of execution of the computer-executable web resource by the proxy-based phishing site.

In various aspects, the authorization verification logic can count, in the centralized event log, a total number of instances (e.g., a total number of records) in which the proxy-based phishing site (e.g., the identified computing domain) executed and/or hosted the computer-executable web resource. In various cases, the authorization verification logic can be configured to refrain from initiating the one or more remedial actions if the total number of instances is lesser than any suitable threshold value. In contrast, the authorization verification logic can be configured to initiate the one or more remedial actions once the total number of instances is greater than and/or equal to any suitable threshold value. In this way, the first several executions of the computer-executable web resource by the proxy-based phishing site, which are likely to be the self-testing instances by the scammer, can refrain from triggering the one or more remedial actions.

In various other aspects, the authorization verification logic can identify an amount of time that has elapsed between the current execution of the computer-executable web resource by the proxy-based phishing site and an immediately previous execution of the computer-executable web resource by the proxy-based phishing site. In various cases, the authorization verification logic can be configured to refrain from initiating the one or more remedial actions if the amount of time is lesser than any suitable threshold amount. In contrast, the authorization verification logic can be configured to initiate the one or more remedial actions if the amount of time is greater than any suitable threshold amount. As mentioned above, when a scammer creates a proxy-based phishing site, the scammer often quickly and repeatedly tests the proxy-based phishing site themself before actively attempting to phish real-world clients. It is often the case that such self-testing executions are followed by a relatively long temporal pause during which the scammer attempts to phish real-world clients. Once one or more real-world clients have been phished, the temporal pause ceases as the one or more real-world clients unknowingly use the proxy-based phishing site to execute the computer-executable web resource. Accordingly, by measuring the amount of time that has elapsed since the most recent execution of the computer-executable web resource by the proxy-based phishing site, this temporal pause can be identified, and the executions of the computer-executable web resource by the proxy-based phishing site that occurred before this temporal pause, which are likely to be the self-testing instances by the scammer, can refrain from triggering the one or more remedial actions.

To help clarify some of the above discussion, consider the following non-limiting example. Suppose that the computing domain of an authorized website is 123helloworld.com. Moreover, suppose that the authorized website offers a sign-in webpage to computing clients. Thus, a computing client that desires to sign-in can transmit, via a browser, to the authorized website a URL that requests the sign-in webpage. As an example, the URL can be www.123helloworld.com/account/sign-in. That is, the URL can recite the computing domain of the authorized website (e.g., 123helloworld.com). Based on receiving the URL, the authorized website can return to the browser of the computing client an HTML document that provides the sign-in webpage, where the form-action attribute of the HTML document recites www.123helloworld.com/account/sign-in. That is, the returned HTML document can specify the computing domain of the authorized website (e.g., 123helloworld.com). Accordingly, the browser of the computing client can visit the sign-in webpage.

Now, suppose that a scammer desires to phish the computing clients of the authorized website. In such case, the scammer can create a fake website which proxies the authorized website. In various cases, the computing domain of the fake website can be 1234helloworld.com. If a computing client has been phished, the browser of the computing client can transmit to the fake website a URL that requests the sign-in webpage. As an example, the URL can be www.1234helloworld.com/account/sign-in. As shown, the URL can recite the computing domain of the fake website (e.g., 1234helloworld.com), rather than the computing domain of the authorized website (e.g., 123helloworld.com). Based on receiving the URL, the fake website can rewrite the URL by replacing any instance of the computing domain of the fake website with the computing domain of the authorized website (e.g., by replacing "1234helloworld.com" in the URL with "123helloworld.com"). The fake website can then transmit the rewritten URL to the authorized website. Based on receiving the rewritten URL, the authorized website can return to the fake website an HTML document that provides the sign-in webpage, where the form-action attribute of the HTML document recites www.123helloworld.com/account/sign-in. That is, the returned HTML document can specify the computing domain of the authorized website (e.g., 123helloworld.com). Based on receiving the HTML document, the fake website can rewrite the HTML document by replacing any instance of the computing domain of the authorized website with the computing domain of the fake website (e.g., by replacing "123helloworld.com" in the HTML document with "1234helloworld.com"). The fake website can then transmit the rewritten HTML document to browser of the computing client. In this way, the sign-in webpage is provided to the computing client, but the sign-in webpage is executed/hosted by the fake website rather than the authorized website. This allows the fake website to maliciously and clandestinely record any information provided by the computing client to the authorized website (e.g., passwords, answers to security questions).

When various embodiments described herein are implemented, the HTML document that is provided by the authorized website to the fake website can contain an obfuscated (e.g., hidden) portion of code. As explained herein, such obfuscated portion of code can be configured to identify, upon execution of the sign-in webpage (e.g., upon execution of the HTML document), the computing domain that is currently executing and/or hosting the sign-in webpage. If the identified computing domain is the same as the computing domain of the authorized website, the obfuscated portion of code can allow the sign-in webpage to function normally. However, if the identified computing domain is not the same as the computing domain of the authorized website, the obfuscated portion of code can initiate one or more remedial actions (e.g., can notify/alert the authorized website, can slow and/or end execution of the sign-in webpage, can input wrong passwords and/or wrong usernames into the input fields of the sign-in webpage). Furthermore, because such portion of code is obfuscated/hidden, the fake website can fail to remove and/or otherwise alter such portion of code when rewriting the HTML document. Thus, the rewritten HTML document can also include such obfuscated portion of code.

Therefore, in this non-limiting example where the computing client has been phished by the fake website whose computing domain is 1234helloworld.com, the obfuscated portion of code in the rewritten HTML document can be run when the browser of the computing client attempts to visit the sign-in webpage by executing the rewritten HTML document. In various instances, the obfuscated portion of code in the rewritten HTML document can determine that the sign-in webpage provided by the rewritten HTML document is being executed and/or hosted by 1234helloworld.com. Since 1234helloworld.com does not match 123helloworld.com (e.g., the authorized computing domain), the obfuscated portion of code can conclude that the sign-in webpage is being executed and/or hosted by an unauthorized website (e.g., by the fake website). In some cases, the obfuscated portion of code can notify and/or alert the authorized website of this unauthorized execution/hosting. In other cases, the obfuscated portion of code can redirect the browser of the computing client to the authorized website (e.g., redirect the browser of the computing client from 1234helloworld.com to 123helloworld.com). In still other cases, the obfuscated portion of code can prevent the sign-in webpage from loading/executing. In yet other cases, the obfuscated portion of code can cause the sign-in webpage to load/execute in safe mode. In even other cases, if the sign-in webpage presents one or more input fields (e.g., a password field, a username field, a CAPTCHA field) to the computing client, the obfuscated portion of code can insert incorrect and/or randomized information into such input fields. In this way, the obfuscated portion of code can automatically detect when an unauthorized domain is executing/hosting the sign-in webpage and can take remedial actions in response.

Accordingly, the computerized tool as described herein can electronically hide an authorization verification logic within a computer-executable web resource. In various cases, the authorization verification logic can be considered as a digital trap-door that automatically opens (e.g., that automatically takes remedial action) when the computer-executable web resource is executed in and/or hosted by an unauthorized computing domain. In this way, a proxy-based phishing site that mirrors an authorized website can be automatically and reliably detected.

Various embodiments described herein can be employed to use hardware and/or software to solve problems that are highly technical in nature (e.g., to facilitate automatic detection of proxy-based phishing sites), that are not abstract and that cannot be performed as a set of mental acts by a human. Further, some of the processes performed can be performed by a specialized computer (e.g., code/script editor) for carrying out defined tasks related to automatic detection of proxy-based phishing sites.

For example, some defined tasks of various embodiments described herein can include: accessing, by a computer system comprising a processor, a computer-executable web resource; and embedding, by the computer system, an authorization verification logic within the computer-executable web resource, such that the authorization verification logic is obfuscated within the computer-executable web resource, and wherein, upon execution of the computer-executable web resource, the authorization verification logic is configured to perform operations comprising: identifying a computing domain via which the computer-executable web resource is being executed; comparing the identified computing domain with one or more authorized computing domains; determining that the identified computing domain is an unauthorized proxy site if the identified computing domain does not match at least one of the one or more authorized computing domains; and initiating a remedial action based on determining that the identified computing domain is an unauthorized proxy site.

Such defined tasks are not performed manually by humans. Indeed, neither the human mind nor a human with pen and paper can electronically retrieve a computer-executable web resource and electronically insert via obfuscation techniques an authorization verification logic into the computer-executable web resource. Moreover, neither the human mind nor a human with pen and paper can electronically identify a computing domain that is currently executing/hosting the web resource, electronically compare the identified computing domain to a list of authorized computing domains to determine whether the identified computing domain is an unauthorized proxy site, and electronically commence remedial actions if the identified computing domain is an unauthorized proxy site. Instead, various embodiments described herein are inherently and inextricably tied to computer technology and cannot be implemented outside of a computing environment. Indeed, a computer-executable web resource is a computerized object defined by one or more coding scripts that cannot exist without computers. Likewise, code that is obfuscated within a computer-executable web resource and that is configured to determine whether an unauthorized proxy site is executing/hosting the computer-executable web resource is also a computerized object that cannot be implemented in any sensible way without computers.

In various instances, embodiments described herein can integrate into a practical application the disclosed teachings regarding automatic detection of proxy-based phishing sites. Indeed, in various embodiments, the disclosed teachings can provide a computerized tool that can automatically, and in an obfuscated manner, embed within a computer-executable web resource an authorization verification logic. In various instances, the authorization verification logic can be one or more lines of code (e.g., one or more lines of JavaScript) that execute whenever the computer-executable web resource is executed. Upon execution, the authorization verification logic can determine whether the domain that is currently executing/hosting the computer-executable web resource is an authorized site or an unauthorized site. If the authorization verification logic determines that the domain is an unauthorized site (e.g., a proxy-based phishing site), the authorization verification logic can cause one or more remedial actions to be facilitated (e.g., can notify and/or alert an entity of the existence of the unauthorized site, can prevent/end the execution of the computer-executable web resource, can cause the computer-executable web resource to execute in safe mode, can input randomized information into input fields that are requested by the computer-executable web resource). Accordingly, embodiments described herein can automatically detect and/or impede proxy-based phishing sites that attempt to execute and/or host computer-executable web resources without authorization. Therefore, both the authorization verification logic and the computerized tool that embeds the authorization verification logic into a computer-executable web resource are useful and practical applications of computers.

Moreover, in various aspects, embodiments described herein can control real-world and/or tangible devices based on the disclosed teachings. For example, a computerized tool as described herein can electronically insert one or more lines of real-world code into a real-world coding script that defines a computer-executable web resource. Moreover, such one or more lines of real-world code can determine whether a real-world computing domain (e.g., a real-world domain name) that is executing/hosting the computer-executable web resource represents an authorized website or an unauthorized proxy-based phishing site. If the latter, the one or more lines of real-world code can facilitate one or more real-world remedial actions (e.g., can generate a real-world alert/notification message, can prevent and/or alter execution of the computer-executable web resource).

It should be appreciated that the figures described herein are non-limiting examples of various embodiments.

FIG. 1 illustrates a high-level block diagram of an example, non-limiting system 100 that can facilitate automatic detection of proxy-based phishing sites in accordance with one or more embodiments described herein.

As shown, a proxy site detection system 102 can be electronically integrated, via any suitable wired and/or wireless electronic connection (e.g., a wired and/or wireless Internet connection), with a computer-executable web resource 104. In various aspects, the computer-executable web resource 104 can be any suitable executable digital file, executable digital document, executable digital script, and/or executable digital object that can be electronically accessed and/or otherwise electronically interacted with on the Internet. As an example, the computer-executable web resource 104 can be a web page (e.g., an HTML document defining a webpage). As another example, the computer-executable web resource 104 can be a web service and/or computer application (e.g., one or more coding scripts that define a web service and/or computer application). In various instances, the computer-executable web resource 104 can be electronically stored by, maintained by, provided by, and/or otherwise associated with one or more authorized websites (not shown).

In various cases, it can be desired to prevent proxy-based phishing sites and/or any other unauthorized websites from impermissibly executing and/or hosting the computer-executable web resource 104. As explained herein, the proxy site detection system 102 can help to accomplish this goal.

In various embodiments, the proxy site detection system 102 can comprise a processor 106 (e.g., computer processing unit, microprocessor) and a computer-readable memory 108 that is operably coupled to the processor 106. The memory 108 can store computer-executable instructions which, upon execution by the processor 106, can cause the processor 106 and/or other components of the proxy site detection system 102 (e.g., transceiver component 110, embedding component 112, logging component 114) to perform one or more acts. In various embodiments, the memory 108 can store computer-executable components (e.g., transceiver component 110, embedding component 112, logging component 114), and the processor 106 can execute the computer-executable components.

In various embodiments, the proxy site detection system 102 can comprise a transceiver component 110. In various aspects, the transceiver component 110 can electronically receive and/or otherwise electronically access the computer-executable web resource 104 (e.g., can receive and/or access one or more coding scripts that define and/or make up the computer-executable web resource 104). In some cases, the transceiver component 110 can electronically retrieve the computer-executable web resource 104 from the one or more authorized websites. In other cases, the transceiver component 110 can electronically retrieve the computer-executable web resource 104 from any other suitable computing device and/or data structure (not shown) that is electronically accessible to the transceiver component 110. In any case, the transceiver component 110 can electronically obtain and/or access the computer-executable web resource 104, such that other components of the proxy site detection system 102 can electronically modify and/or interact with the computer-executable web resource 104.

In various embodiments, the proxy site detection system 102 can comprise an embedding component 112. In various aspects, the embedding component 112 can electronically embed an authorization verification logic within the computer-executable web resource 104. In other words, the embedding component 112 can electronically insert one or more lines of code into the one or more coding scripts that define and/or make up the computer-executable web resource 104, where such one or more lines of code can be configured to facilitate automatic detection of proxy-based phishing sites as described herein. In various cases, such one or more lines of code can be considered as the authorization verification logic. In various instances, the embedding component 112 can electronically embed the authorization verification logic into the computer-executable web resource 104 in an obfuscated manner. This can cause the authorization verification logic to be hidden and/or otherwise not easily visually noticeable within the computer-executable web resource 104. In various aspects, the embedding component 112 can accomplish this via any suitable obfuscation techniques (e.g., font minimization, deceptive syntax, dispersed syntax, white box cryptography). In any case, the embedding component 112 can electronically add the authorization verification logic to the computer-executable web resource 104, such that the authorization verification logic is executed when the computer-executable web resource 104 is executed.

In various instances, when the computer-executable web resource 104 undergoes execution, the authorization verification logic can perform the following operations. In various aspects, the authorization verification logic can identify a computing domain that is currently executing and/or hosting the computer-executable web resource 104. In various cases, the authorization verification logic can identify the computing domain by checking the location of a browser that is currently accessing and/or interacting with the computer-executable web resource 104, by checking an SSL context and/or a TLS context that is being applied to the computer-executable web resource 104, by checking one or more domain names that are specified by the computer-executable web resource 104 itself, and/or in any other suitable fashion. In various instances, the authorization verification logic can compare the identified computing domain to one or more authorized computing domains that correspond to the one or more authorized websites. If the identified computing domain matches at least one of the one or more authorized computing domains (e.g., if the identified domain name matches at least one of the one or more authorized domain names), the authorization verification logic can conclude that the computer-executable web resource 104 is currently being executed/hosted by one of the one or more authorized websites. On the other hand, if the identified computing domain does not match at least one of the one or more authorized computing domains (e.g., if the identified domain name does not match at least one of the one or more authorized domain names), the authorization verification logic can conclude that the computer-executable web resource 104 is currently being executed/hosted by an unauthorized website (e.g., by a website other than any of the one or more authorized websites). In such case, the authorization verification logic can conclude, infer, and/or assume that the identified computing domain corresponds to and/or otherwise represents a proxy-based phishing site. Accordingly, the authorization verification logic can initiate a remedial action.

In various aspects, the remedial action can be any suitable electronic action. As an example, the remedial action can include the generation and/or transmission of a warning/alert to at least one of the one or more authorized websites, where the warning/alert indicates that the identified computing domain is a proxy-based phishing site. As another example, the remedial action can include throttling of the execution of the computer-executable web resource 104, such that the computer-executable web resource 104 is prevented from executing fully and/or at all. As yet another example, if the computer-executable web resource 104 requests usernames and/or passwords, the remedial action can include providing incorrect and/or randomized usernames and/or passwords to the computer-executable web resource 104.

In various aspects, after the embedding component 112 has embedded the authorization verification logic into the computer-executable web resource 104, the transceiver component 110 can electronically transmit the computer-executable web resource 104 back to the one or more authorized websites (and/or back to the other computing device and/or data structure from which the transceiver component 110 obtained the computer-executable web resource 104). Thus, the one or more authorized websites can offer the computer-executable web resource 104 to one or more computing clients, and the authorization verification logic that is embedded within the computer-executable web resource 104 can automatically determine whether any of such computing clients are proxy-based phishing sites.

In various embodiments, the proxy site detection system 102 can comprise a logging component 114. In various aspects, the logging component 114 can electronically store and/or maintain a centralized event log. In various instances, the centralized event log can be any suitable data structure in which electronic results generated by the authorization verification logic can be recorded, documented, stored, and/or flagged. In various cases, when the authorization verification logic concludes that the computer-executable web resource 104 is currently being executed and/or hosted by a proxy-based phishing site, the authorization verification logic can electronically record in the centralized event log the computing domain of the proxy-based phishing site. Moreover, in various aspects, when the authorization verification logic concludes that the computer-executable web resource 104 is currently being executed and/or hosted by a proxy-based phishing site, the authorization verification logic can electronically record in the centralized event log the time and/or date of such execution/hosting.

In various embodiments, when the authorization verification logic concludes that the computer-executable web resource 104 is currently being executed and/or hosted by a particular proxy-based phishing site, the authorization verification logic can electronically count, in the centralized event log, a total number of instances in which the particular proxy-based phishing site has previously executed/hosted the computer-executable web resource 104. If such total number of instances is lesser than any suitable threshold, the authorization verification logic can refrain from initiating the remedial action. In contrast, if such total number of instances is greater than the threshold, the authorization verification logic can initiate the remedial action. In this way, the remedial action can be delayed until after a threshold number of executions of the computer-executable web resource 104 by the particular proxy-based phishing site have occurred (e.g., as mentioned above, the first several executions can be self-tests conducted by the scammer that set up the particular proxy-based phishing site).

In various other embodiments, when the authorization verification logic concludes that the computer-executable web resource 104 is currently being executed and/or hosted by a particular proxy-based phishing site, the authorization verification logic can electronically determine, by leveraging the centralized event log, an amount of time that has elapsed since the particular proxy-based phishing site most recently previously executed/hosted the computer-executable web resource 104. If such amount of time is lesser than any suitable threshold, the authorization verification logic can refrain from initiating the remedial action. In contrast, if such amount of time is greater than the threshold, the authorization verification logic can initiate the remedial action. In this way, the remedial action can be delayed until after a threshold pause in executions of the computer-executable web resource 104 by the particular proxy-based phishing site has occurred (e.g., as mentioned above, such threshold pause can separate the self-tests conducted by the scammer from genuine executions conducted by phished clients).

Figure 2:
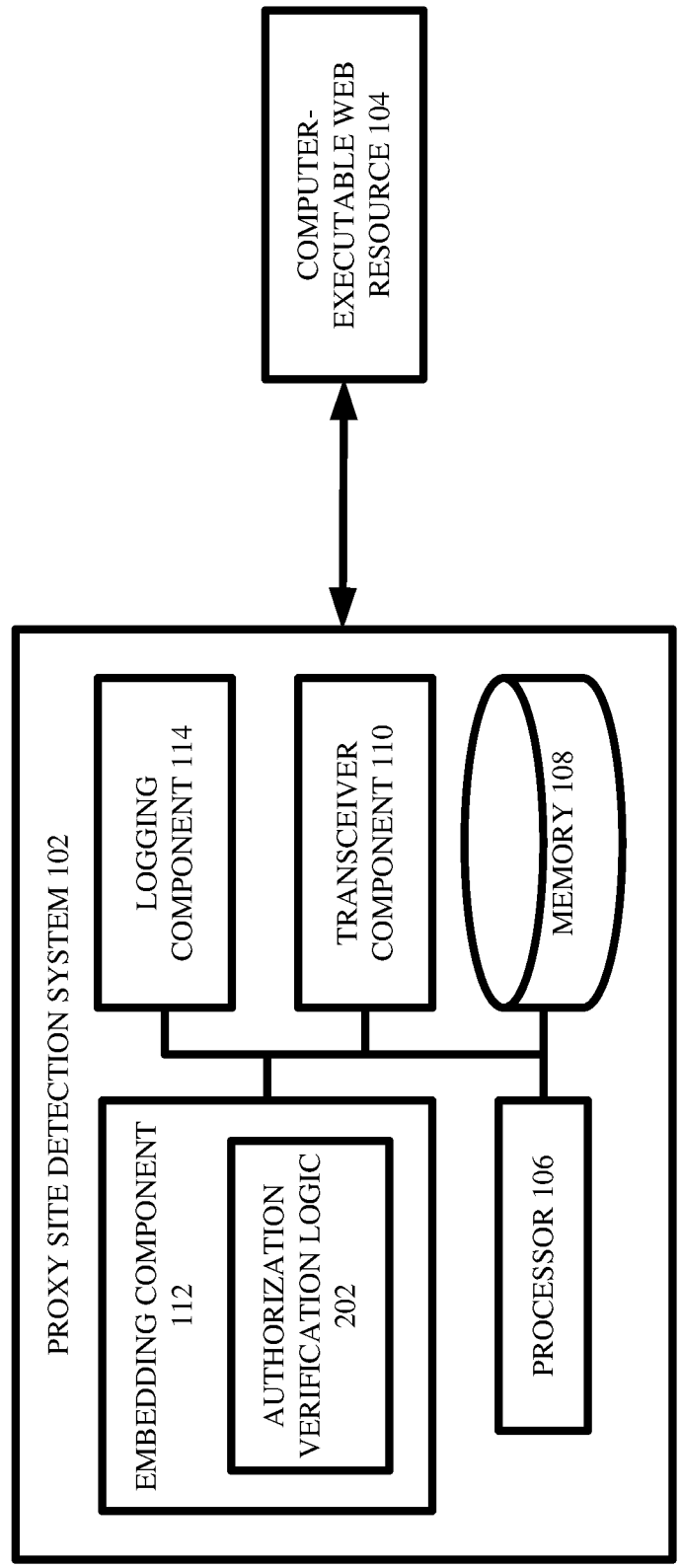
FIG. 2 illustrates a high-level block diagram of an example, non-limiting system including an authorization verification logic that facilitates automatic detection of proxy-based phishing sites in accordance with one or more embodiments described herein.

FIG. 2 illustrates a high-level block diagram of an example, non-limiting system 200 including an authorization verification logic that can facilitate automatic detection of proxy-based phishing sites in accordance with one or more embodiments described herein. As shown, the system 200 can, in some cases, comprise the same components as the system 100, and can further comprise an authorization verification logic 202.

In various embodiments, the embedding component 112 can electronically embed the authorization verification logic 202 into the computer-executable web resource 104. In various aspects, the authorization verification logic 202 can be one or more lines of computer code (e.g., one or more lines of JavaScript code, one or more lines of C++ code, one or more lines of Python code, one or more lines of Web Assembly code), which one or more lines of computer code can facilitate automatic detection of proxy-based phishing sites. More specifically, the authorization verification logic 202 can identify a computing domain that is executing/hosting the computer-executable web resource 104, can compare the identified computing domain to one or more authorized computing domains, can determine that the identified computing domain is a proxy-based phishing site if the identified computing domain does not match any of the one or more authorized computing domains, and can initiate one or more remedial actions accordingly. This is illustrated with respect to FIG. 3.

Figure 3:
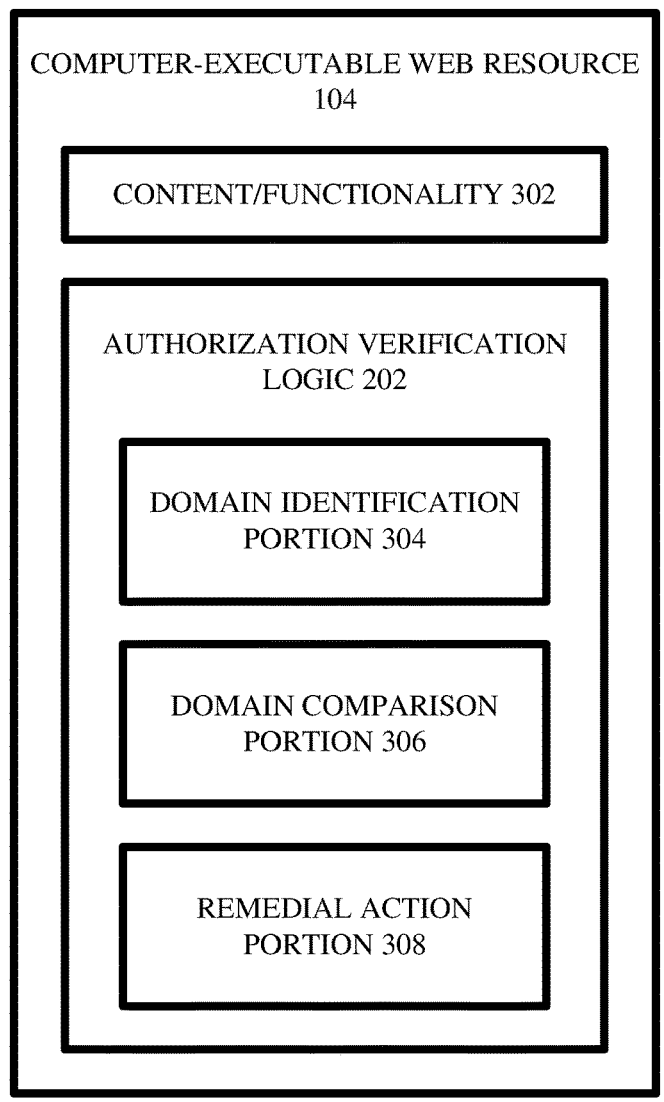
FIG. 3 illustrates a high-level block diagram of an example, non-limiting computer-executable web resource in which an authorization verification logic is embedded in accordance with one or more embodiments described herein.

FIG. 3 illustrates a high-level block diagram of an example, non-limiting computer-executable web resource in which an authorization verification logic is embedded in accordance with one or more embodiments described herein. In other words, FIG. 3 depicts a non-limiting example of the computer-executable web resource 104 and the authorization verification logic 202.

As shown, the computer-executable web resource 104 can provide, contain, and/or otherwise be associated with a content/functionality 302, where the content/functionality 302 can be any suitable digital content and/or any suitable digital service/functionality as desired. As also shown, the embedding component 112 can electronically insert and/or embed the authorization verification logic 202 into the computer-executable web resource 104, such that the authorization verification logic 202 can be considered as being part of the computer-executable web resource 104. Accordingly, when the computer-executable web resource 104 is executed, the authorization verification logic 202 can likewise be executed.

In various instances, the authorization verification logic 202 can be a collection of computer code that includes three coding portions: a domain identification portion 304; a domain comparison portion 306; and/or a remedial action portion 308.

In various aspects, the domain identification portion 304 can be one or more lines of computer code (e.g., for-loops, if-loops, while-loops, function-calls) which, when executed, determine an identity of a computing domain that is currently electronically executing and/or otherwise currently electronically hosting the computer-executable web resource 104. In other words, the domain identification portion 304 can identify the name of the domain that is currently executing and/or hosting the computer-executable web resource 104. As those having ordinary skill in the art will appreciate, the name of a computing domain that is executing/hosting a web resource can be considered as a queryable attribute. Accordingly, the domain identification portion 304 can identify the computing domain in any suitable fashion. As an example, the domain identification portion 304 can identify the computing domain by querying an applicable SSL context and/or TLS context that is governing the execution of the computer-executable web resource 104 (e.g., the applicable SSL context and/or TLS context can specify the identity of the computing domain that is currently executing/hosting the computer-executable web resource 104). As another example, the domain identification portion 304 can identify the computing domain by querying the location of a browser that is visiting and/or interacting with the computer-executable web resource 104 (e.g., the browser's metadata can specify the identity of the computing domain that is currently executing/hosting the computer-executable web resource 104). As still another example, the domain identification portion 304 can identify the computing domain by querying the one or more coding scripts that define the computer-executable web resource 104 itself (e.g., the one or more coding scripts of the computer-executable web resource 104 can specify, such as in a form-action attribute, the identity of the computing domain that is currently executing/hosting the computer-executable web resource 104). In any case, the domain identification portion 304 can identify the computing domain that is currently executing/hosting the computer-executable web resource 104.

In various aspects, the domain comparison portion 306 can be one or more lines of computer code (e.g., for-loops, if-loops, while-loops, function-calls) which, when executed, compare the computing domain identified by the domain identification portion 304 with one or more authorized computing domains. In various cases, the one or more authorized computing domains can be a list of domain names that are known to be permitted to execute/host the computer-executable web resource 104. If the identified computing domain matches and/or is the same as at least one of the one or more authorized computing domains, the domain comparison portion 306 can conclude and/or infer that the identified computing domain is permitted to execute/host the computer-executable web resource 104. In other words, the domain comparison portion 306 can conclude that the identified computing domain represents one of the one or more authorized websites and does not represent a proxy-based phishing site. In contrast, if the identified computing domain does not match and/or is not the same as at least one of the one or more authorized computing domains, the domain comparison portion 306 can conclude and/or infer that the identified computing domain is not permitted to execute/host the computer-executable web resource 104. In other words, the domain comparison portion 306 can conclude that the identified computing domain does not represent any of the one or more authorized websites and instead represents a proxy-based phishing site.

In various aspects, the remedial action portion 308 can be one or more lines of computer code (e.g., for-loops, if-loops, while-loops, function-calls) which, when executed, initiate and/or otherwise commence one or more remedial actions if the domain comparison portion 306 determines that the identified computing domain represents a proxy-based phishing site. As an example, the one or more remedial actions can include notifying and/or otherwise alerting any of the one or more authorized websites that the identified computing domain is a proxy-based phishing site (e.g., the remedial action portion 308 can electronically generate and/or transmit a warning message to the one or more authorized websites). As another example, the one or more remedial actions can include notifying and/or alerting a computing client that the identified computing domain is a proxy-based phishing site (e.g., the remedial action portion 308 can electronically generate and/or transmit a warning message to the browser of the computing client). As still another example, the one or more remedial actions can include redirecting a computing client away from the identified computing domain and to any of the one or more authorized websites (e.g., the remedial action portion 308 can electronically cause the browser of the computing client to exit the identified computing domain and to visit any of the one or more authorized websites). As yet another example, the one or more remedial actions can include ending and/or ceasing the execution of the computer-executable web resource 104 by the identified computing domain (e.g., the remedial action portion 308 can electronically shut down and/or interrupt the instance of the computer-executable web resource 104 that is being executed/hosted by the identified computing domain). As even another example, the one or more remedial actions can include causing the computer-executable web resource 104 to operate in safe mode. As still another example, if the computer-executable web resource 104 requests private information (e.g., passwords) from a computing client, the one or more remedial actions can include providing incorrect information to the computer-executable web resource 104 (e.g., if the computer-executable web resource 104 has an input field that requests a password, the remedial action portion 308 can electronically prevent the computing client from manually type passwords into the input field and can electronically insert incorrect and/or randomized passwords into the input field). In various aspects, the one or more remedial actions can include any other suitable actions, as desired.

Although not explicitly shown in FIG. 3, the embedding component 112 can apply one or more obfuscation techniques to the authorization verification logic 202, such that the authorization verification logic 202 is obfuscated and/or otherwise hidden within the computer-executable web resource 104. As those having ordinary skill in the art will appreciate, the embedding component 112 can implement any suitable obfuscation techniques. As an example, the embedding component 112 can implement font minimization to obfuscate the authorization verification logic 202 (e.g., the embedding component 112 can electronically write the authorization verification logic 202 into the one or more scripts of the computer-executable web resource 104 using a very small font, such that the authorization verification logic 202 is not easily visible in the computer-executable web resource 104). As another example, the embedding component 112 can implement deceptive syntax to obfuscate the authorization verification logic 202 (e.g., the embedding component 112 can electronically write the authorization verification logic 202 using randomly-named and/or misnamed function-calls and/or loops, such that the authorization verification logic 202, although visible, is not easily understood and/or recognized). As still another example, the embedding component 112 can implement dispersed syntax to obfuscate the authorization verification logic 202 (e.g., the embedding component 112 can electronically insert different portions and/or sub-portions of the authorization verification logic 202 into different locations of the one or more scripts of the computer-executable web resource 104, such that the authorization verification logic 202 is distributed throughout the computer-executable web resource 104 and is thus not easily noticed). As yet another example, the embedding component 112 can implement any suitable cryptographic technique (e.g., white box cryptography) to obfuscate the authorization verification logic 202.

Figure 4:
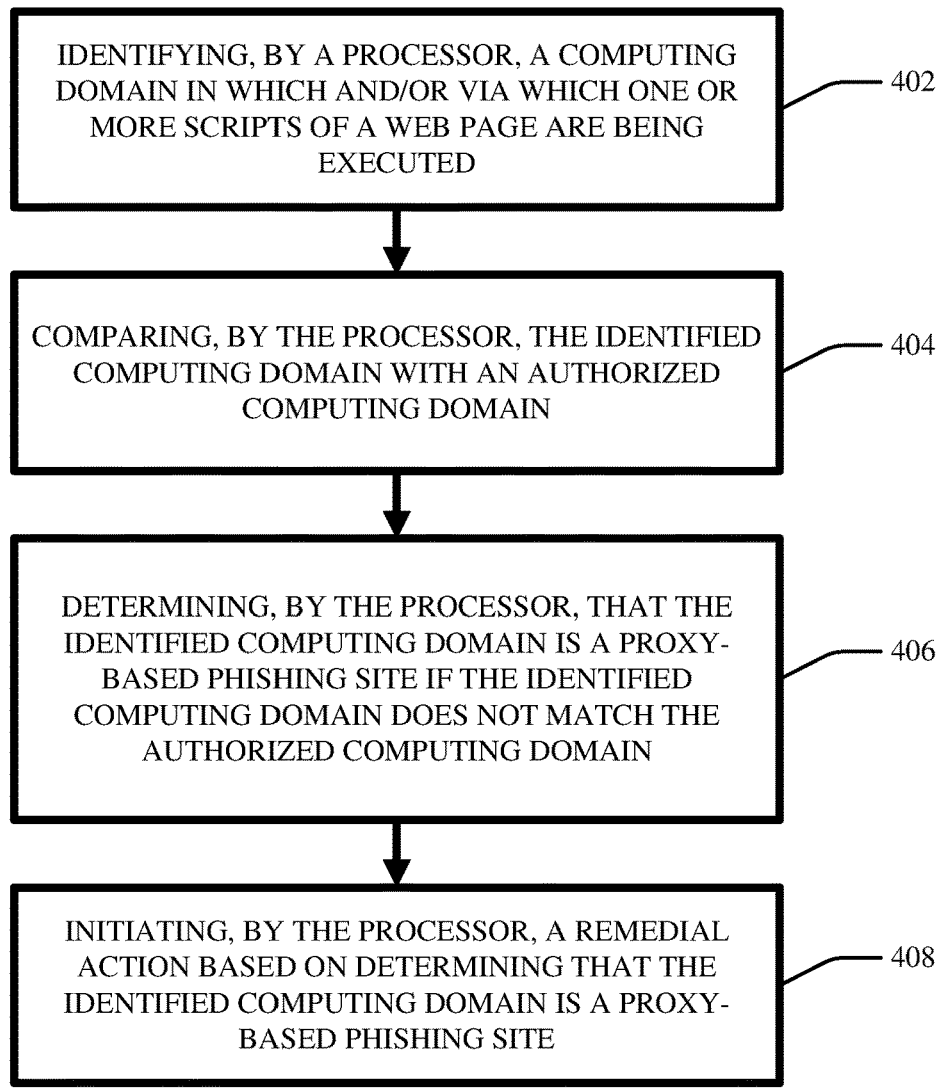
FIG. 4 illustrates a high-level flow diagram of an example, non-limiting computer-implemented method that facilitates automatic detection of proxy-based phishing sites in accordance with one or more embodiments described herein.

FIG. 4 illustrates a high-level flow diagram of an example, non-limiting computer-implemented method 400 that can facilitate automatic detection of proxy-based phishing sites in accordance with one or more embodiments described herein. In various cases, the computer-implemented method 400 can be facilitated by the authorization verification logic 202.

In various embodiments, act 402 can include identifying, by a processor (e.g., via 304), a computing domain in which and/or via which one or more scripts of a web page (e.g., 104) are being executed. As mentioned above, this can be accomplished by querying an SSL context of the webpage, a TLS context of the webpage, metadata of a browser visiting the webpage, and/or the webpage itself.

In various aspects, act 404 can include comparing, by the processor (e.g., via 306), the identified computing domain with an authorized computing domain. As mentioned above, the authorized computing domain can be a domain name of a website that is authorized and/or permitted to execute/host the webpage.

In various instances, act 406 can include determining, by the processor (e.g., 306), that the identified computing domain is a proxy-based phishing site if the identified computing domain does not match the authorized computing domain. As mentioned above, if the identified computing domain matches and/or is the same as the authorized computing domain, it can be inferred that the identified computing domain has permission to execute/host the webpage. On the other hand, if the identified computing domain does not match and/or is not the same as the authorized computing domain, it can be inferred that the identified computing domain lacks permission to execute/host the webpage.

In various cases, act 408 can include initiating, by the processor (e.g., via 308), a remedial action based on determining that the identified computing domain is a proxy-based phishing site. As mentioned above, the remedial action can include notifying/alerting any suitable entity that the identified computing domain is a proxy-based phishing site, throttling and/or ending execution of the webpage, redirecting a computing client away from the identified computing domain and toward the authorized computing domain, and/or inputting incorrect information into input data fields of the webpage.

In various aspects, once the embedding component 112 embeds the authorization verification logic 202 within the computer-executable web resource 104, the transceiver component 110 can electronically transmit the computer-executable web resource 104 back to the one or more authorized websites. So, the one or more authorized websites can offer the computer-executable web resource 104 to computing clients, and the authorization verification logic 202, which is embedded within the computer-executable web resource 104, can automatically determine whether any of such computing clients are proxy-based phishing sites. This is further discussed with respect to FIGS. 5-6.

Figure 5:
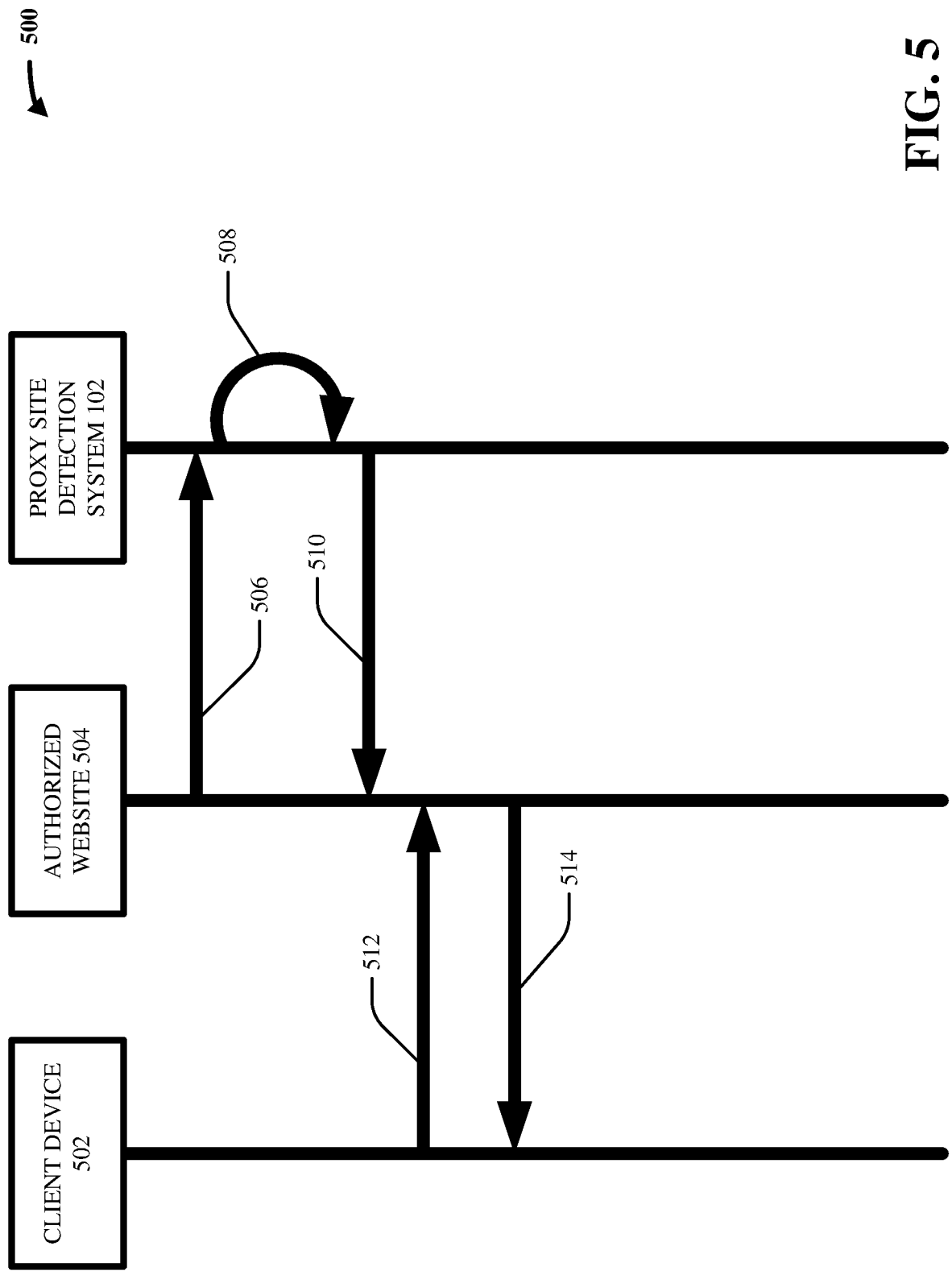
FIG. 5 illustrates a high-level communication diagram showing how an authorization verification logic embedded in a computer-executable web resource can be implemented when a client device communicates with an authorized website in accordance with one or more embodiments described herein.

FIG. 5 illustrates a high-level communication diagram 500 showing how the authorization verification logic 202 embedded in the computer-executable web resource 104 can be implemented when a client device 502 communicates with an authorized website 504 in accordance with one or more embodiments described herein.

In various cases, the client device 502 can be any suitable computing device (e.g., can be a laptop computer, a desktop computer, a smart phone). In various instances, the authorized website 504 can be any suitable website that stores, maintains, provides, and/or otherwise controls the computer-executable web resource 104. In various cases, an operator/user of the client device 502 can desire to access the computer-executable web resource 104. Moreover, in various cases, an operator/user of the authorized website 504 can desire to make the computer-executable web resource 104 available to computing clients while safeguarding the computer-executable web resource 104 from proxy-based phishing sites. As explained herein, the proxy site detection system 102 can facilitate such safeguarding.

In various embodiments, the authorized website 504 can electronically transmit, at act 506, the computer-executable web resource 104 to the proxy site detection system 102. In other words, the transceiver component 110 of the proxy site detection system 102 can electronically retrieve and/or otherwise electronically access the computer-executable web resource 104.

In various aspects, the embedding component 112 of the proxy site detection system 102 can electronically insert and/or otherwise electronically embed, at act 508, the authorization verification logic 202 into the computer-executable web resource 104. In various cases, as mentioned above, the embedding component 112 can apply one or more obfuscation techniques (e.g., font minimization, deceptive syntax, cryptography), such that the authorization verification logic 202 is hidden and/or otherwise not easily noticeable within the computer-executable web resource 104.

In various instances, the transceiver component 110 of the proxy site detection system 102 can electronically transmit, at act 510, the computer-executable web resource 104 back to the authorized website 504. Because the authorization verification logic 202 is now hidden within the computer-executable web resource 104, the authorized website 504 can offer the computer-executable web resource 104 to computing clients, and the authorization verification logic 202 can automatically and reliably determine whether any of such computing clients are proxy-based phishing sites. For instance, consider the client device 502.

In the non-limiting example of FIG. 5, the client device 502 can be not phished by a proxy-based phishing site. Accordingly, the client device 502 can electronically transmit, at act 512, to the authorized website 504 a URL that requests the computer-executable web resource 104. Because the client device 502 is communicating with the authorized website 504, the URL can specify a first computing domain (e.g., a first domain name) that corresponds to authorized website 504.

In various aspects, based on receiving the URL from the client device 502, the authorized website 504 can electronically provide, at act 514, the computer-executable web resource 104 to the client device 502, and the client device 502 can electronically execute the computer-executable web resource 104 in and/or via the first computing domain of the authorized website 504. During such execution, the authorization verification logic 202 that is obfuscated within the computer-executable web resource 104 can be executed. Accordingly, the authorization verification logic 202 can electronically identify which computing domain is currently executing/hosting the computer-executable web resource 104 and can compare such computing domain to the first computing domain of the authorized website 504. In the non-limiting example shown in FIG. 5, the computer-executable web resource 104 is being executed/hosted in and/or via the first computing domain at act 514. Accordingly, the authorization verification logic 202 can determine that the computing domain that is currently executing/hosting the computer-executable web resource 104 is the first computing domain. Thus, the authorization verification logic 202 can allow the computer-executable web resource 104 to function as normal.

Figure 6:
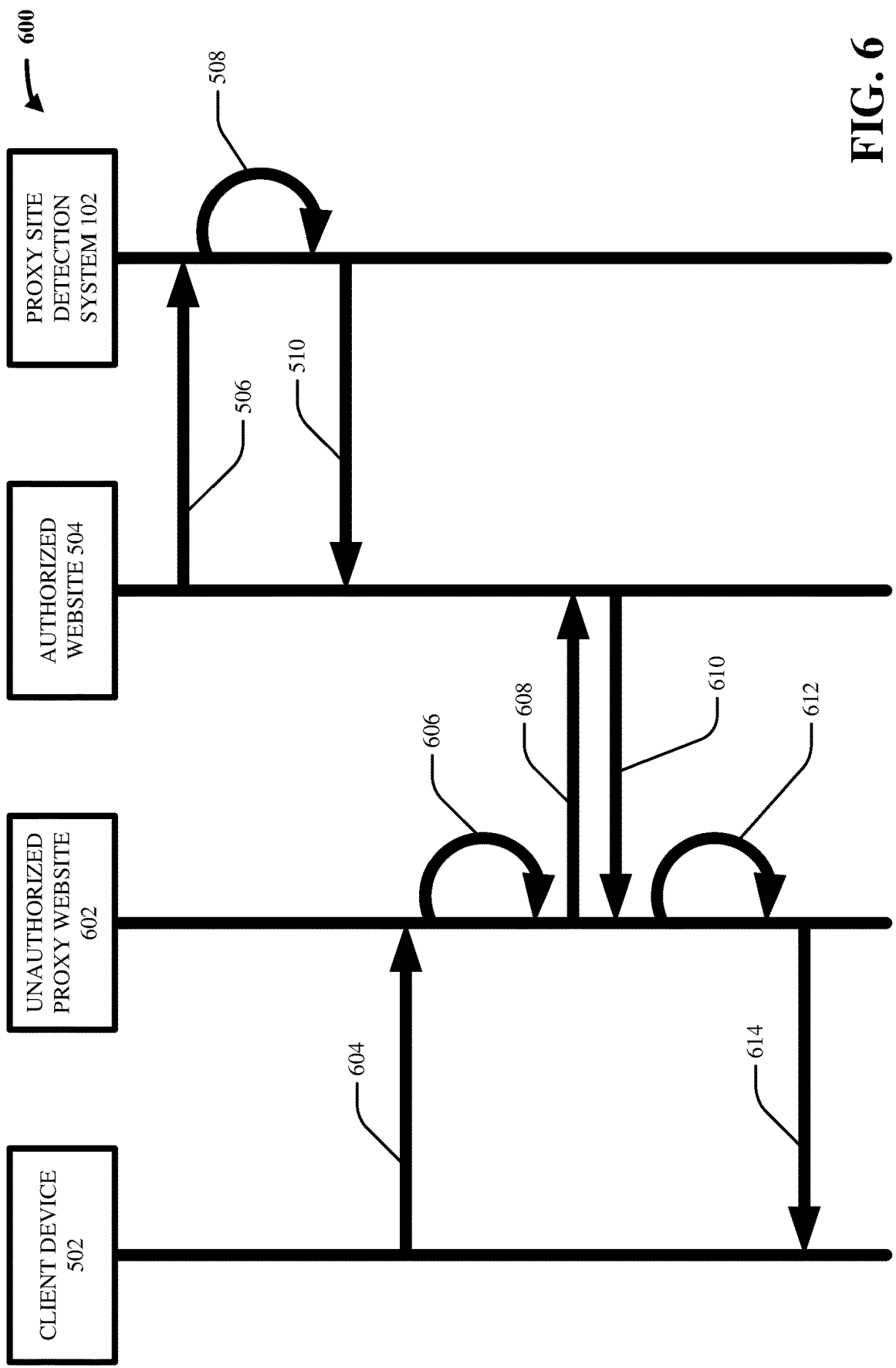
FIG. 6 illustrates a high-level communication diagram showing how an authorization verification logic embedded in a computer-executable web resource can be implemented when a client device communicates with an unauthorized proxy website in accordance with one or more embodiments described herein.

FIG. 6 illustrates a high-level communication diagram 600 showing how the authorization verification logic 202 embedded in the computer-executable web resource 104 can be implemented when the client device 502 communicates with an unauthorized proxy website 602 in accordance with one or more embodiments described herein. In various cases, the unauthorized proxy website 602 can be any suitable website that is impermissibly proxying the authorized website 504. Accordingly, while FIG. 5 shows how the authorization verification logic 202 can function when the client device 502 has not been phished by the unauthorized proxy website 602, FIG. 6 shows how the authorization verification logic 202 can function when the client device 502 has been phished by the unauthorized proxy website 602.

In various cases, acts 506-510 can be as described above.

In various embodiments, the client device 502 can electronically transmit, at act 604, to the unauthorized proxy website 602 a URL that requests the computer-executable web resource 104. Because the client device 502 is communicating with the unauthorized proxy website 602, the URL can specify a second computing domain (e.g., a second domain name) that corresponds to the unauthorized proxy website 602, rather than the first computing domain of the authorized website 504.

In various aspects, based on receiving the URL from the client device 502, the unauthorized proxy website 602 can electronically rewrite, at act 606, the URL. Specifically, the unauthorized proxy website 602 can replace every instance of the second computing domain that appears in the URL with the first computing domain.

In various instances, the unauthorized proxy website 602 can electronically transmit, at act 608, the rewritten URL to the authorized website 504. In other words, the client device 502 can be considered as requesting the computer-executable web resource 104 from the unauthorized proxy website 602, and the unauthorized proxy website 602 can be considered as requesting the computer-executable web resource 104 from the authorized website 504.

Note that the authorized website 504 can, at this point in time, not yet know that the unauthorized proxy website 602 is nefarious. Indeed, from the perspective of the authorized website 504, the unauthorized proxy website 602 can appear to be just another computing client that is requesting the computer-executable web resource 104.

In various aspects, based on receiving the rewritten URL from the unauthorized proxy website 602, the authorized website 504 can electronically provide, at act 610, the computer-executable web resource 104 to the unauthorized proxy website 602, and the unauthorized proxy website 602 can execute the computer-executable web resource 104 in and/or via the first computing domain of the authorized website 504. During such execution, the authorization verification logic 202 that is obfuscated within the computer-executable web resource 104 can be executed. Accordingly, the authorization verification logic 202 can electronically identify which computing domain is currently executing/hosting the computer-executable web resource 104 and can compare such computing domain to the first computing domain of the authorized website 504. In the non-limiting example shown in FIG. 6, the computer-executable web resource 104 is being executed/hosted by the first computing domain at act 610. Accordingly, at act 610, the authorization verification logic 202 can determine that the computing domain that is currently executing/hosting the computer-executable web resource 104 is the first computing domain. Thus, the authorization verification logic 202 can allow the computer-executable web resource 104 to function as normal.

In various instances, based on receiving and/or otherwise interacting with the computer-executable web resource 104, the unauthorized proxy website 602 can electronically rewrite and/or modify, at act 612, the computer-executable web resource 104. Specifically, the unauthorized proxy website 602 can replace every instance of the first computing domain that appears in one or more scripts that define the computer-executable web resource 104 with the second computing domain. Because the authorization verification logic 202 can be obfuscated and/or hidden within the one or more scripts that define the computer-executable web resource 104, the authorization verification logic 202 can escape alteration by the unauthorized proxy website 602.

In various aspects, the unauthorized proxy website 602 can electronically provide, at act 614, the rewritten version of the computer-executable web resource 104 to the client device 502, and the client device 502 can electronically execute the rewritten version of the computer-executable web resource 104 in and/or via the second computing domain of the unauthorized proxy website 602. During such execution, the authorization verification logic 202 that is obfuscated within the rewritten version of the computer-executable web resource 104 can be executed. Accordingly, the authorization verification logic 202 can electronically identify which computing domain is currently executing/hosting the rewritten version of the computer-executable web resource 104 and can compare such computing domain to the first computing domain of the authorized website 504. In the non-limiting example shown in FIG. 6, the rewritten version of the computer-executable web resource 104 is being executed/hosted in and/or via the second computing domain at act 614. Accordingly, the authorization verification logic 202 can determine that the computing domain that is currently executing/hosting the rewritten version of the computer-executable web resource 104 is the second computing domain, which does not match the first computing domain. Thus, the authorization verification logic 202 can electronically initiate one or more remedial actions, as described herein.

In this way, the authorization verification logic 202 can be considered as a digital trap-door that safeguards the computer-executable web resource 104 when an unauthorized website attempts to execute/host the computer-executable web resource 104.

Figure 7:
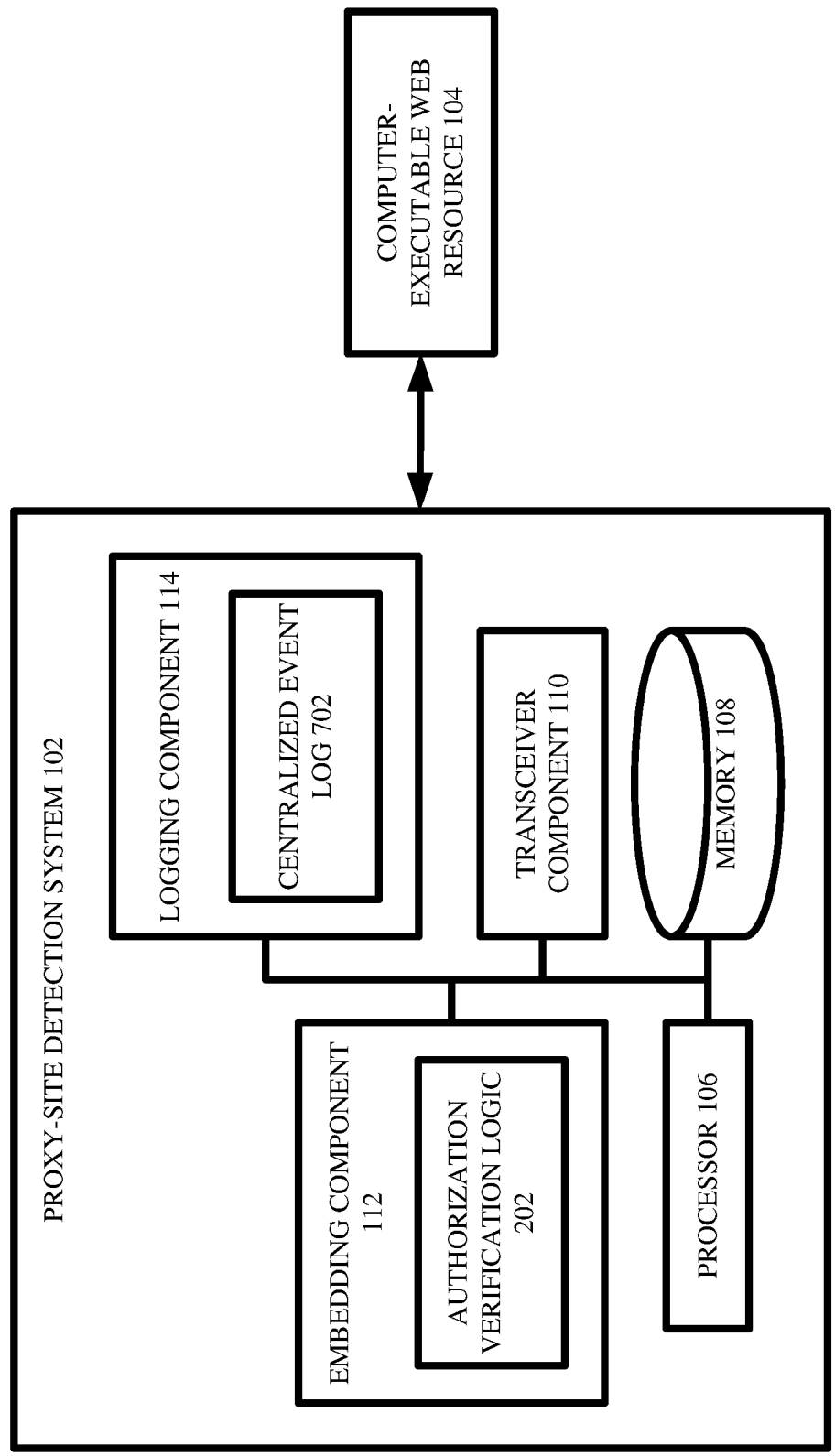
FIG. 7 illustrates a high-level block diagram of an example, non-limiting system including a centralized event log that facilitates automatic detection of proxy-based phishing sites in accordance with one or more embodiments described herein.

FIG. 7 illustrates a high-level block diagram of an example, non-limiting system 700 including a centralized event log that can facilitate automatic detection of proxy-based phishing sites in accordance with one or more embodiments described herein. As shown, the system 700 can, in some cases, comprise the same components as the system 200, and can further comprise a centralized event log 702.

In various embodiments, the logging component 114 can electronically store, maintain, and/or otherwise control the centralized event log 702. In various aspects, the centralized event log 702 can be any suitable data structure in which the authorization verification logic 202 can store, record, document, and/or otherwise flag results that it produces. For example, when the authorization verification logic 202 concludes that the computer-executable web resource 104 is being executed/hosted by a proxy-based phishing site, the authorization verification logic 202 can create an electronic record of such execution/hosting, which electronic record indicates the computing domain of the proxy-based phishing site and/or the time/date when the proxy-based phishing site executed/hosted the computer-executable web resource 104. Those having ordinary skill in the art will appreciate that the authorization verification logic 202 can electronically record any other suitable information in the centralized event log 702.

In various aspects, the authorization verification logic 202 can utilize the centralized event log 702 to delay the one or more remedial actions initiated by the remedial action portion 308. As a non-limiting example, when the authorization verification logic 202 concludes that the computer-executable web resource 104 is being executed/hosted by a proxy-based phishing site, the authorization verification logic 202 can refrain from initiating the one or more remedial actions until the proxy-based phishing site has executed the computer-executable web resource 104 a threshold number of times. More specifically, if the authorization verification logic 202 concludes that the computer-executable web resource 104 is being executed/hosted by a given proxy-based phishing site, the authorization verification logic 202 can count, in the centralized event log 702, a total number of times that the given proxy-based phishing site has previously executed the computer-executable web resource 104. If the total number of times is lesser than any suitable threshold, the authorization verification logic 202 can refrain from initiating the one or more remedial actions. On the other hand, if the total number of times is greater than any suitable threshold, the authorization verification logic 202 can initiate the one or more remedial actions.

As another non-limiting example, when the authorization verification logic 202 concludes that the computer-executable web resource 104 is being executed/hosted by a proxy-based phishing site, the authorization verification logic 202 can refrain from initiating the one or more remedial actions until a suitably-long temporal pause between executions of the computer-executable web resource 104 by the proxy-based phishing site has occurred. More specifically, if the authorization verification logic 202 concludes that the computer-executable web resource 104 is being executed/hosted by a given proxy-based phishing site, the authorization verification logic 202 can compute, by querying the centralized event log 702, an amount of time that has elapsed since the given proxy-based phishing site has most recently executed the computer-executable web resource 104. If the amount of time is lesser than any suitable threshold, the authorization verification logic 202 can refrain from initiating the one or more remedial actions. On the other hand, if the amount of time is greater than any suitable threshold, the authorization verification logic 202 can initiate the one or more remedial actions. In such embodiments, once a suitably-long temporal pause has been detected with respect to a particular proxy-based phishing site, the authorization verification logic 202 can refrain from checking for a suitably-long temporal pause when future executions of the computer-executable web resource 104 by the particular proxy-based phishing site are detected.

In this way, the centralized event log 702 can be leveraged so as to delay initiation of the one or more remedial actions.

Figure 8:
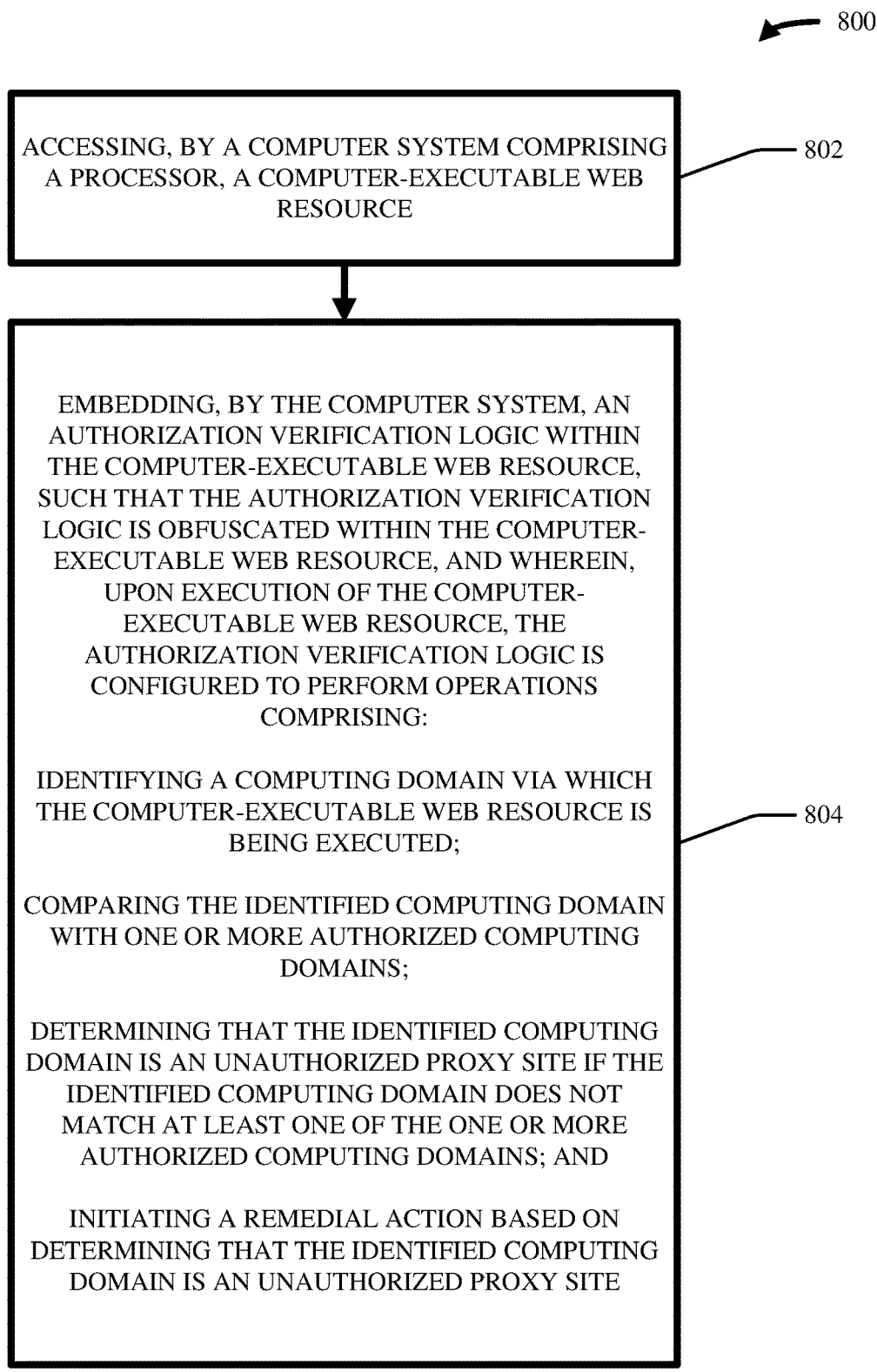
FIG. 8 illustrates a high-level flow diagram of an example, non-limiting computer-implemented method that facilitates automatic detection of proxy-based phishing sites in accordance with one or more embodiments described herein.

FIG. 8 illustrates a high-level flow diagram of an example, non-limiting computer-implemented method 800 that can facilitate automatic detection of proxy-based phishing sites in accordance with one or more embodiments described herein. In various cases, the computer-implemented method 800 can be facilitated by the proxy site detection system 102.

In various embodiments, act 802 can include accessing, by a computer system (e.g., 110) comprising a processor, a computer-executable web resource (e.g., 102). In various cases, the computer system can access, receive, and/or retrieve the computer-executable web resource in any suitable fashion and/or from any suitable source.

In various aspects, act 804 can include embedding, by the computer system (e.g., 112), an authorization verification logic (e.g., 202) within the computer-executable web resource, such that the authorization verification logic is obfuscated within the computer-executable web resource. In various aspects, upon execution of the computer-executable web resource, the authorization verification logic can be configured to perform various operations.

In some cases, such operations can include identifying (e.g., via 304) a computing domain via which the computer-executable web resource is being executed. As mentioned above, the authorization verification logic can facilitate this by querying an SSL context and/or TLS context associated with the computer-executable web resource, and/or by querying metadata of a browser that is visiting the computer-executable web resource.

In various instances, such operations can further include comparing (e.g., via 306) the identified computing domain with one or more authorized computing domains. As mentioned above, the one or more authorized computing domains can be considered as representing one or more websites that are known to have permission and/or authorization to execute/host the computer-executable web resource.

In various aspects, such operations can further include determining (e.g., via 306) that the identified computing domain is an unauthorized proxy site if the identified computing domain does not match at least one of the one or more authorized computing domains. As mentioned above, if the identified computing domain (e.g., the domain that is currently executing/hosting the computer-executable web resource) does not match any of the one or more authorized computing domains, this can indicate that the identified computing domain does not have authorization/permission to execute/host the computer-executable web resource.

In various cases, such operations can further include initiating (e.g., via 308) a remedial action based on determining that the identified computing domain is an unauthorized proxy site. As mentioned above, such remedial action can include notifying/alerting any suitable entity that the identified computing domain is an unauthorized proxy site, throttling and/or otherwise altering the execution of the computer-executable web resource, redirecting a computing client away from the identified computing domain and toward any of the one or more authorized computing domains, and/or inputting incorrect information into input fields that are generated by the computer-executable web resource.

Although not explicitly shown in FIG. 8, the authorization verification logic can be obfuscated within the computer-executable web resource via font minimization. In other cases, the authorization verification logic can be obfuscated within the computer-executable web resource via cryptography. In still other cases, the authorization verification logic can be obfuscated within the computer-executable web resource via deceptive syntax.

Although not explicitly shown in FIG. 8, if the authorization verification logic determines that the identified computing domain is an unauthorized proxy site, the authorization verification logic can record in a centralized event log (e.g., 702) the execution of the computer-executable web resource by the identified computing domain. In some cases, the authorization verification logic can be configured to count, in the centralized event log, a number of times that the identified computing domain has executed the computer-executable web resource, and the authorization verification logic can be configured to initiate the remedial action based on the number of times being greater than a predetermined threshold. In other cases, the authorization verification logic can be configured to identify, in the centralized event log, an amount of time that has elapsed since a previous execution of the computer-executable web resource by the identified computing domain, and the authorization verification logic can be configured to initiate the remedial action based on the amount of time being greater than a predetermined threshold.

Various embodiments described herein include a computerized tool that can embed an authorization verification logic within a computer-executable web resource, where the authorization verification logic can function as a digital trap-door that safeguards the computer-executable web resource from being executed in and/or by unauthorized computing domains. Such a computerized tool certainly constitutes a useful and practical application of computers.

In various aspects, any of the herein-described functionalities can, in some cases, be facilitated by machine learning and/or artificial intelligence. To facilitate some of the above-described machine learning aspects of various embodiments of the subject innovation, consider the following discussion of artificial intelligence. Various embodiments of the present innovation herein can employ artificial intelligence (AI) to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the subject innovation, and it should be further understood that, in various other embodiments of the subject innovation, it can be the case that such description applies to fewer than "each" of that particular computerized object.

Figure 9:
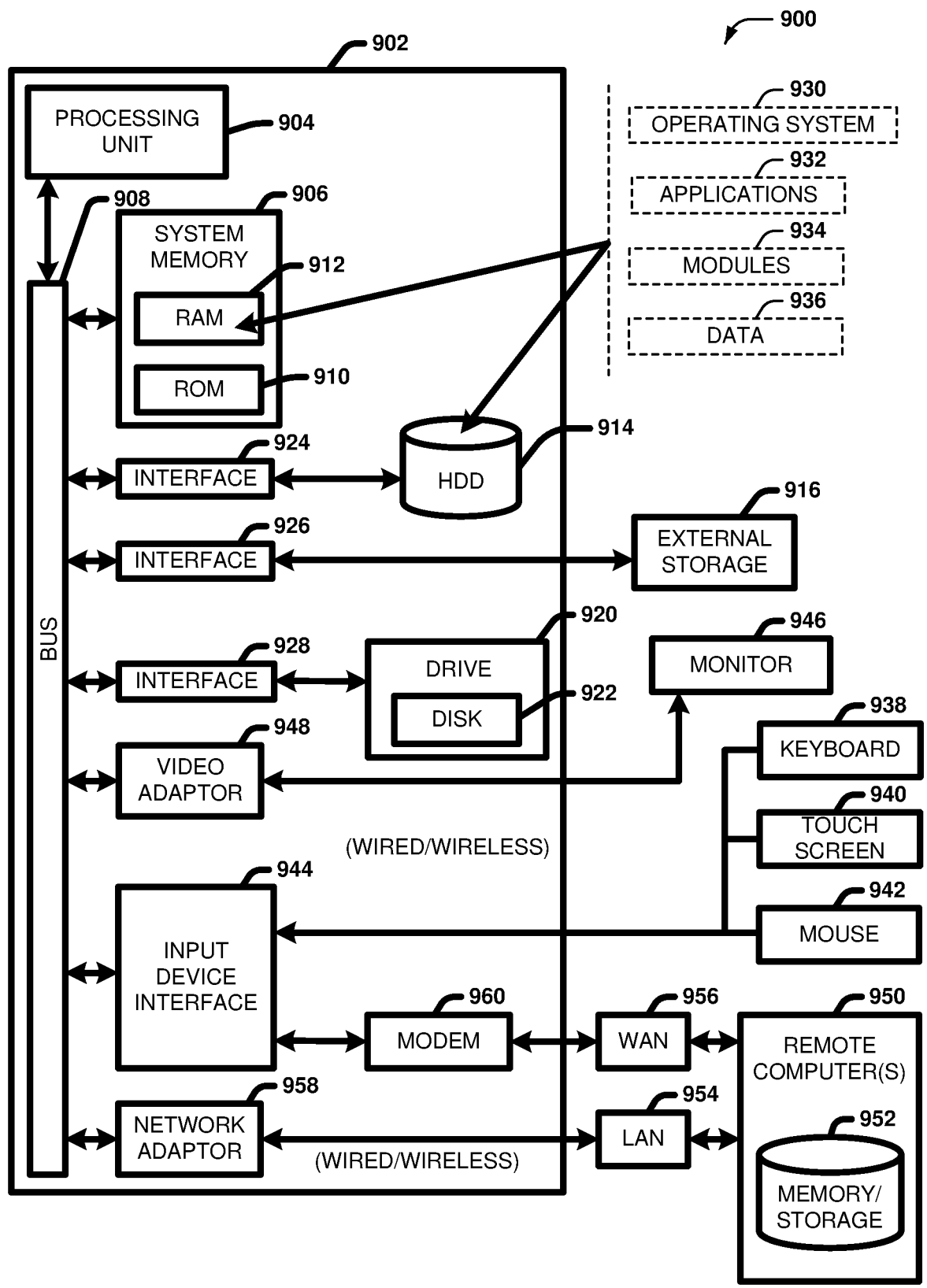
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
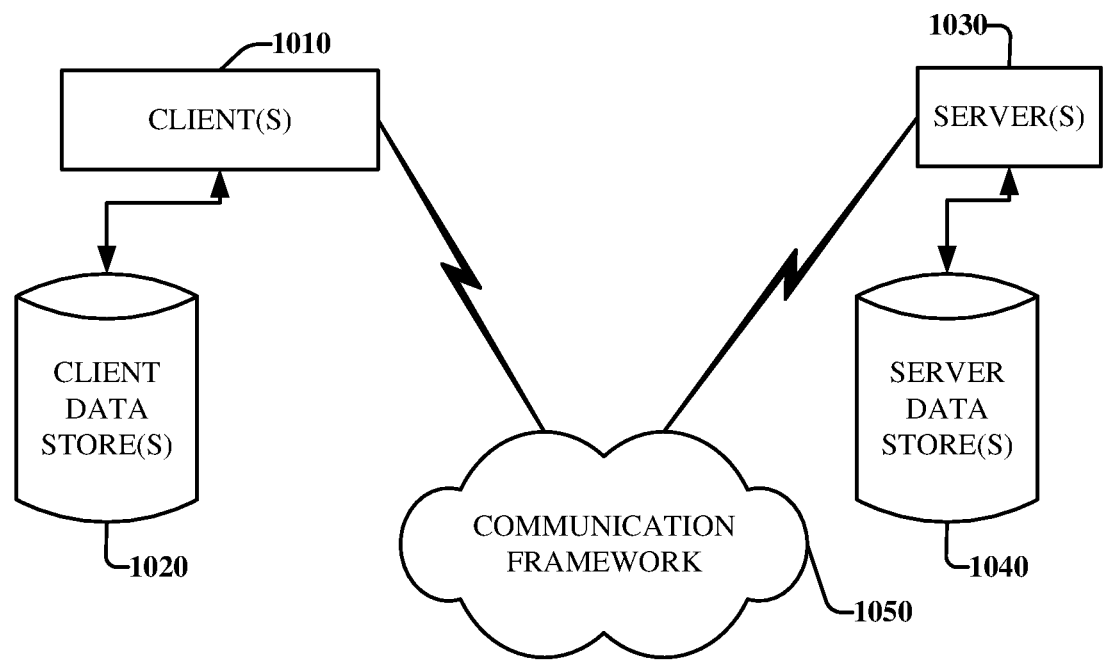
FIG. 10 illustrates an example networking environment operable to execute various implementations described herein.

FIG. 10 is a schematic block diagram of a sample computing environment 1000 with which the disclosed subject matter can interact. The sample computing environment 1000 includes one or more client(s) 1010. The client(s) 1010 can be hardware and/or software (e.g., threads, processes, computing devices). The sample computing environment 1000 also includes one or more server(s) 1030. The server(s) 1030 can also be hardware and/or software (e.g., threads, processes, computing devices). The servers 1030 can house threads to perform transformations by employing one or more embodiments as described herein, for example. One possible communication between a client 1010 and a server 1030 can be in the form of a data packet adapted to be transmitted between two or more computer processes. The sample computing environment 1000 includes a communication framework 1050 that can be employed to facilitate communications between the client(s) 1010 and the server(s) 1030. The client(s) 1010 are operably connected to one or more client data store(s) 1020 that can be employed to store information local to the client(s) 1010. Similarly, the server(s) 1030 are operably connected to one or more server data store(s) 1040 that can be employed to store information local to the servers 1030.

Various embodiments described herein may be a system, a method, an apparatus and/or a computer program product at any possible technical detail level of integration. The computer program product can include a computer readable storage medium (or media) having computer readable program instructions thereon for causing a processor to carry out aspects of various embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of various embodiments described herein.

Aspects of various embodiments are described herein with reference to flowchart illustrations and/or block diagrams of methods, apparatus (systems), and computer program products according to various embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
 a processor; and
 a non-transitory computer-readable medium having stored thereon computer-executable instructions that are executable by the processor to cause the system to perform operations comprising:

accessing, by the system, a computer-executable web resource; and embedding, by the system, an authorization verification logic within the computer-executable web resource in a first computing domain, wherein, upon execution of the computer-executable web resource in or via the first computing domain by a second computing domain, the authorization verification logic is configured to perform operations comprising:

identifying the second computing domain executing the computer-executable web resource;

comparing the identified second computing domain executing the computer-executable web resource with one or more authorized computing domains;

determining that the identified second computing domain is an unauthorized proxy site if the identified second computing domain does not match at least one of the one or more authorized computing domains;

recording the execution of the computer-executable web resource by the identified second computing domain in a centralized event log;

identifying, in the centralized event log, an amount of time that has elapsed since a previous execution of the computer-executable web resource by the identified second computing domain; and performing a remedial action based on determining that the identified second computing domain is the unauthorized proxy site and the amount of time being greater than a predetermined threshold.

2. The system of claim 1, wherein the authorization verification logic is configured to count, in the centralized event log, a number of times that the identified second computing domain has executed the computer-executable web resource, and wherein the authorization verification logic is configured to initiate the remedial action based on the number of times being greater than a second predetermined threshold.

3. The system of claim 1, wherein the remedial action includes transmitting an alert to a computing device, wherein the alert indicates that the identified second computing domain is the unauthorized proxy site.

4. The system of claim 1, wherein the remedial action includes redirecting a client of the identified second computing domain to at least one of the one or more authorized computing domains.

5. The system of claim 1, wherein the remedial action includes inserting an incorrect randomized password into a password field that is generated by the execution of the computer-executable web resource.

6. The system of claim 1, wherein the computer-executable web resource is a webpage, and wherein the identified second computing domain is a phishing site.

7. A computer-implemented method, comprising:

accessing, by a computer system comprising a processor, a computer-executable web resource; and embedding, by the computer system, an authorization verification logic within the computer-executable web resource in a first computing domain, such that the authorization verification logic is obfuscated within the computer-executable web resource, and wherein, upon execution of the computer-executable web resource in or via the first computing domain by a second computing domain, the authorization verification logic is configured to perform operations comprising:

identifying a computing domain executing the computer-executable web resource in or via the first computing domain;

comparing the identified computing domain executing the computer-executable web resource with one or more authorized computing domains;

determining that the identified computing domain is an unauthorized proxy site if the identified computing domain does not match at least one of the one or more authorized computing domains;

recording the execution of the computer-executable web resource by the identified computing domain in a centralized event log;

identifying, in the centralized event log, an amount of time that has elapsed since a previous execution of the computer-executable web resource by the identified computing domain; and performing a remedial action based on determining that the identified computing domain is the unauthorized proxy site and the amount of time being greater than a certain threshold.

8. The computer-implemented method of claim 7, wherein the authorization verification logic is obfuscated within the computer-executable web resource via font minimization.

9. The computer-implemented method of claim 7, wherein the authorization verification logic is obfuscated within the computer-executable web resource via cryptography.

10. The computer-implemented method of claim 7, wherein the authorization verification logic is obfuscated within the computer-executable web resource via deceptive syntax.

11. The computer-implemented method of claim 7, wherein, if the authorization verification logic determines that the identified computing domain is the unauthorized proxy site, the authorization verification logic is configured to count a number of times that the identified computing domain has executed the computer-executable web resource, wherein the authorization verification logic is configured to initiate the remedial action based on the number of times being greater than a predetermined threshold.

12. The computer-implemented method of claim 7, wherein the remedial action includes at least one of: transmitting an alert to a computing device, wherein the alert indicates that the identified computing domain is the unauthorized proxy site; redirecting a client of the identified computing domain to at least one of the one or more authorized computing domains; or inserting an incorrect password into a password field that is generated by the execution of the computer-executable web resource.

13. The computer-implemented method of claim 7, wherein the computer-executable web resource is a webpage, and wherein the identified computing domain is a phishing site.

14. A non-transitory computer-readable medium having program instructions stored thereon that are executable by a computer system to cause the computer system to perform operations comprising:

identifying, by the computer system, a computing domain executing one or more scripts of a web page in or via another computing domain;

comparing, by the computer system, the identified computing domain executing the one or more scripts of the web page with one or more authorized computing domains;

determining, by the computer system, that the identified computing domain is an unauthorized proxy site if the identified computing domain does not match at least one of the one or more authorized computing domains;

recording the execution of the one or more scripts of the web page by the identified computing domain in a centralized event log;

identifying, in the centralized event log, an amount of time that has elapsed since a previous execution of the one or more scripts of the web page by the identified computing domain; and performing, by the computer system, a remedial action based on determining that the identified computing domain is the unauthorized proxy site and the amount of time being greater than a threshold amount of time ago.

15. The non-transitory computer-readable medium of claim 14, wherein the program instructions are obfuscated within the one or more scripts of the web page via at least one of font minimization, cryptography, or deceptive syntax.

16. The non-transitory computer-readable medium of claim 14, wherein the performing of the remedial action is based on determining that the identified computing domain has executed the one or more scripts of the web page more than a threshold number of times.

17. The non-transitory computer-readable medium of claim 14, wherein the remedial action includes generating an alert that indicates that the identified computing domain is the unauthorized proxy site.

* * * * *